Figure 1:
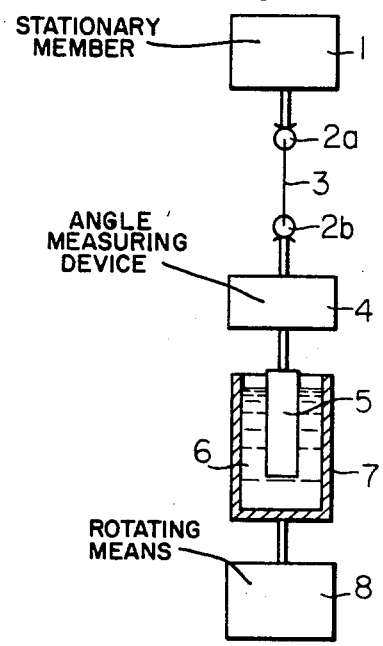

United States Patent
Yamazaki et al.

[15] 3,661,012
[45] May 9, 1972

[54] APPARATUS FOR MEASURING TORSIONAL RIGIDITY OF FILAMENTOUS MATERIAL

[72] Inventors: Chikayasu Yamazaki, Kyoto-shi; Minoru Okabayashi; Koichiro Ando, both of Otsu-shi, all of Japan

[73] Assignee: Toray Industries, Inc., Tokyo, Japan

[22] Filed: July 9, 1969

[21] Appl. No.: 840,147

[30] Foreign Application Priority Data

Jan. 16, 1969   Japan....................................44/3002

[52] U.S. Cl..............................................................73/99
[51] Int. Cl. ..........................................................G01n 3/22
[58] Field of Search......................73/99, 60, 54, 59, 1 C, 1 E

[56] References Cited

UNITED STATES PATENTS 2,977,790   4/1961   Dubsky et al...............................73/60

FOREIGN PATENTS OR APPLICATIONS 1,038,011   9/1953   France......................................73/60

Primary Examiner—Richard C. Queisser
Assistant Examiner—M. Smollar
Attorney—Robert E. Burns and Emmanuel J. Lobato

[57] ABSTRACT

An apparatus for measuring the torsional rigidity of a fibrous material utilizes a rotating viscous liquid of known viscosity to impart a torque to the fibrous material. The fibrous material is clamped at its upper and lower ends by clamping devices and the lower clamping device is connected to a cylindrical mass which is floated in a viscous liquid of known viscosity contained within an outer container. The outer container is rotationally driven to impart a circular motion to the viscous liquid which accordingly applies a torque to the cylindrical mass. The torque applied to the cylindrical mass effects turning of the fibrous material and the extent of turning is measured to obtain an output proportional to the torsional rigidity of the fibrous material.

9 Claims, 10 Drawing Figures

CIRCUMFERENTIAL DIRECTION

APPARATUS FOR MEASURING TORSIONAL RIGIDITY OF FILAMENTOUS MATERIAL

The present invention relates to an apparatus for measuring very small twisting torque of a filamentous material such as fiber, and more particularly, relates to an apparatus for measuring the torsional rigidity accurately and continuously.

Generally, there are several well-known methods for measuring torsional rigidity of a fiber as follows:

1. A top-end of a fiber is rigidly supported by a stationary clamp, a bottom-end of the fiber is connected to a rigid member having a predetermined moment of inertia, then the rigid member is subjected to a swing motion around the fiber axis. The torsional rigidity of the fiber can be obtained by measuring a frequency of the rigid member's swing motion. The above-mentioned measuring method is hereinafter referred to as "torsion-pendulum method."
2. A top end of a fiber is fixed to a shaft which is supported by a bearing and is provided with a device for detecting torque, a bottom end of the fiber is connected to a rigid member turnable around the fiber axis, then the rigid member is turned at a constant speed. A torsional rigidity of the fiber can be obtained by measuring a torque of the shaft. The above-mentioned measuring method is hereinafter referred to as "torque measuring method."

However, the above-mentioned first method is inevitably accompanied with the following drawbacks.
a. Torsional rigidity in several conditions of turning with different angles can not be measured.
b. As torsional rigidities in both opposite directions interfere principally with each other, it is impossible to measure a torsional rigidity in one direction independently.
c. It is difficult to provide a rigid member with a swing motion in a stable condition, just any device can not be used for measuring the torsional rigidity of very fine fiber.

On the other hand, the above-mentioned second method is also accompanied with such drawbacks as;
d. It is impossible to measure the torsional rigidity of fiber having lower rigidity, because the precision or sensitivity of the torque measuring device is only about 1 mg-cm.
e. As it is impossible to make a torque in a reverse direction at a position of bearing zero, certain measuring errors can not be avoided.
f. To impart a constant tension to a fiber, a very complex device for controlling fiber tension is required.

The principal object of the present invention is to provide an improved apparatus for measuring torsional rigidity eliminating the above-mentioned drawbacks possessed by the conventional methods.

Figure 2:
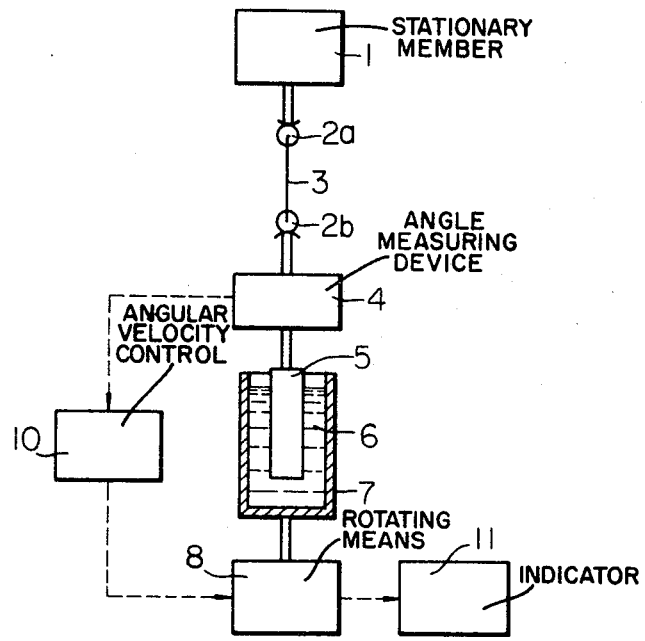
Figure 3:
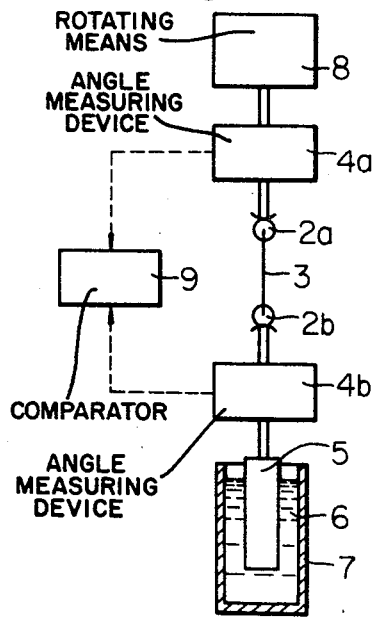
Figure 4:
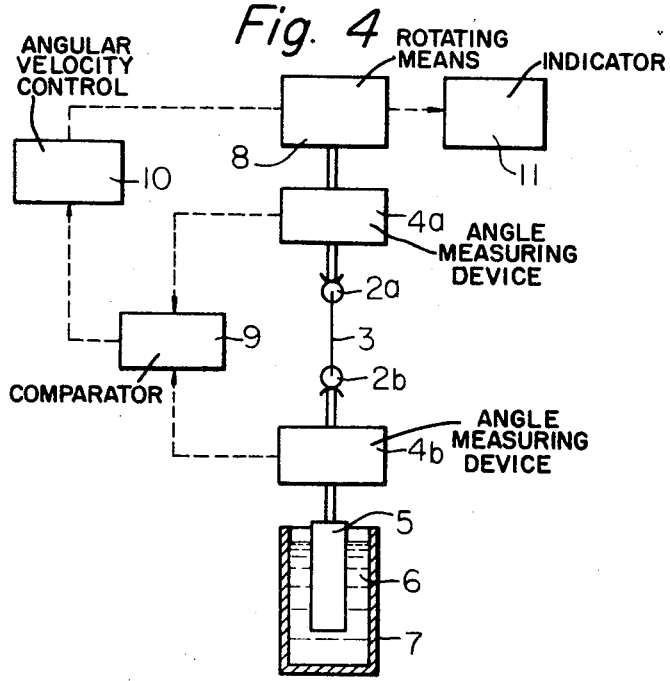
Figure 5:
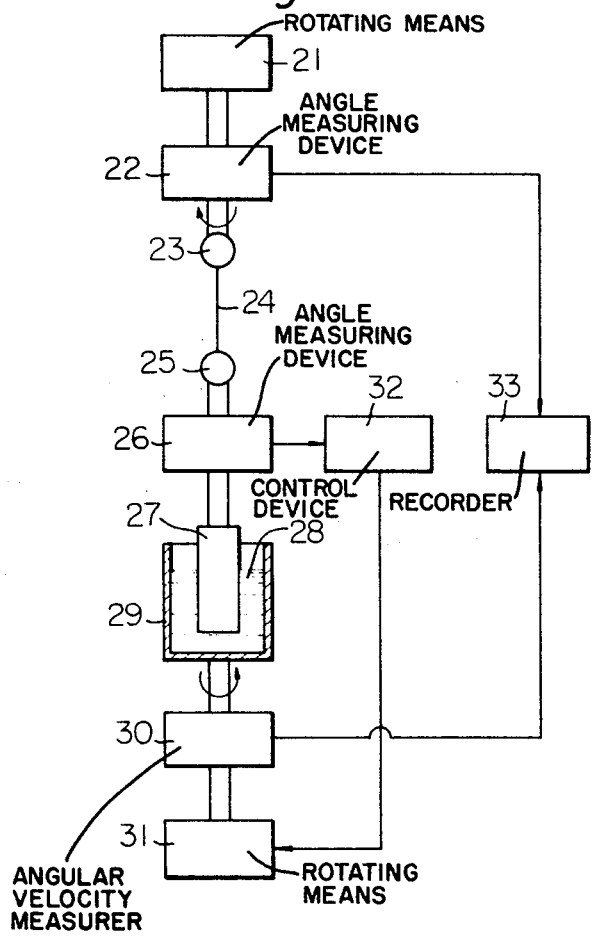
Figure 6:
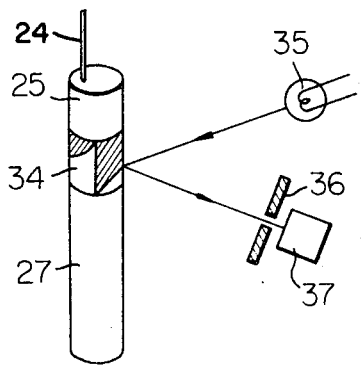
Figure 7:
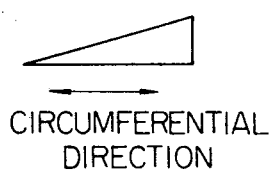
Figure 8:
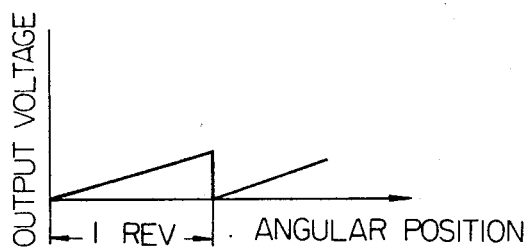
Figure 9:
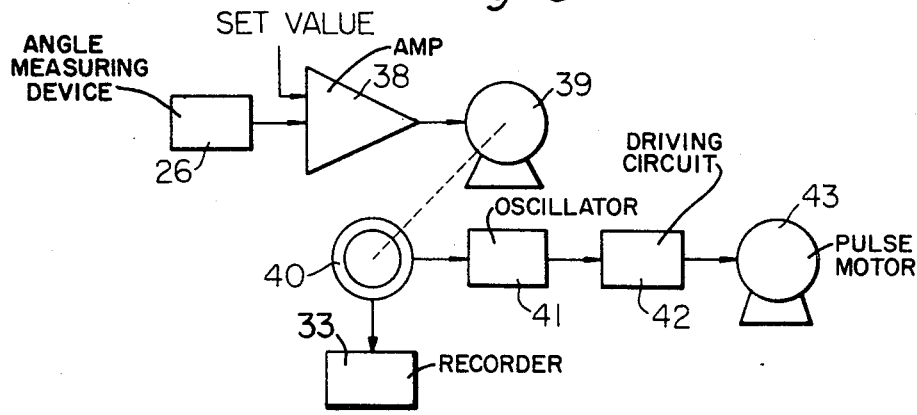
Figure 10:
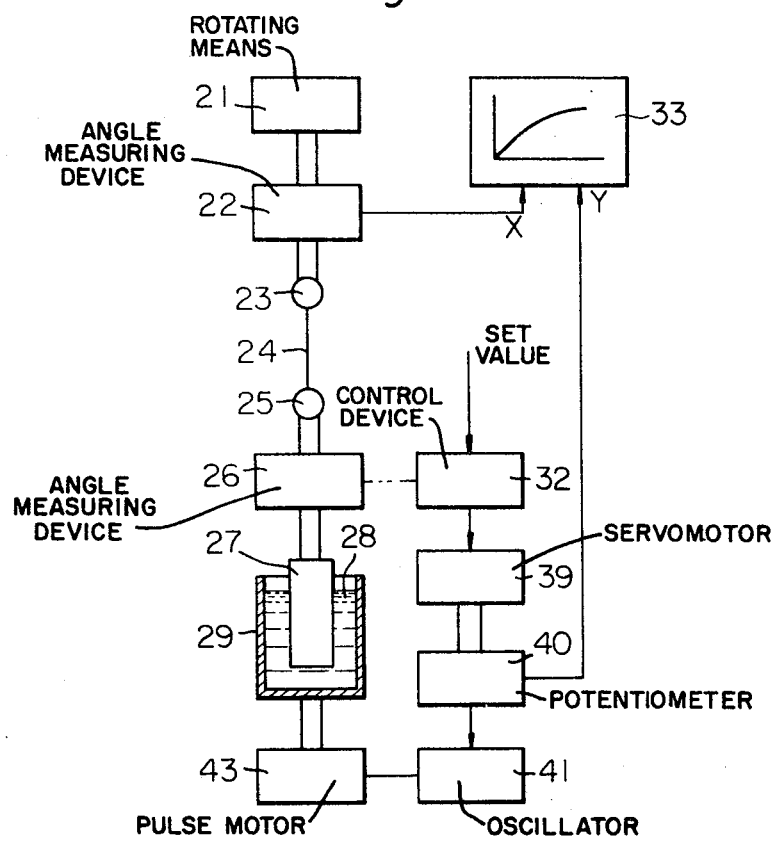

Other objects and features of the present invention are hereinafter more fully set forth with reference to the accompanying drawings, wherein:

FIG. 1 is a schematic side view of a measuring apparatus according to the present invention, FIG. 2 is a schematic side view of a modified measuring apparatus, with an added device for controlling an angular velocity and a device for indicating the angular velocity to the apparatus shown in FIG. 1, FIG. 3 is a schematic side view of another embodiment of the apparatus according to the present invention, FIG. 4 is a schematic side view of a modified measuring apparatus with an added device for controlling an angular velocity and a device for indicating the angular velocity to the apparatus shown in FIG. 3, FIG. 5 is a block diagram including a schematic side view of another type of a measuring apparatus according to the present invention, FIG. 6 is an explanational drawing of a device for detecting angular displacement of filamentous material according to the present invention, FIG. 7 is a spread-out drawing of a reflection member of the device for detecting angular displacement of filamentous material shown in FIG. 6, FIG. 8 is a diagram showing an output of a photo-cell used for the apparatus shown in FIG. 5, FIG. 9 is a block diagram of an embodiment of a measuring device including a detecting device for detecting an angular velocity of a driving device at variable speeds, and a device for controlling the turning speed of a test piece, attached for the apparatus according to the present invention, FIG. 10 is a block diagram including a schematic side view of another type of a measuring apparatus according to the present invention.

In an apparatus for measuring torsional rigidity according to the present invention shown in FIG. 1, an upper end of a fiber 3 is supported rigidly by an upper clamp 2a secured to a stationary member 1, a bottom end of the fiber 3 is gripped by a lower clamp 2b which is connected to the device 4 for measuring a torsional angle. The device 4 for measuring a torsional angle is connected to a device for producing torque comprising an outside cylinder 7 containing a viscous liquid 6 and an inside cylinder comprising an inertial mass floating in the viscous liquid 6 and a device 8 for turning the outside cylinder 7. As shown in FIG. 1, the measuring device 4 is connected to the inside cylinder 5 and the outside cylinder 7 is connected to the turning device 8. Therefore, when the outside cylinder 7 is turned by the turning device 8 at an adjustable angular velocity, the following torque M is imparted to the inside cylinder 5 which is disposed coaxially in the outside cylinder 7;

$$M = \frac{4\pi \eta h R_1^2 R_2^2}{R_1^2 - R_2^2} \omega_1$$

where;
$R_1$ represents a radius of the outside cylinder 7
$R_2$ represents a radius of the inside cylinder 5
$h$ represents a depth of the inside cylinder 5 immersed into the viscous liquid 6
$\eta$ represents viscosity of the viscous liquid 6
$\omega_1$ represents an angular speed of the rotation of the outside cylinder 7.

Therefore, by choosing the constants $R_1$, $R_2$, h and $\eta$ in any value, and predetermining the angular speed $\omega_1$ of the rotation of the outside cylinder 7, a predetermined torque M can be imparted to the inside cylinder 5. By imparting the above-mentioned torque M to the inside cylinder 5, the fiber 3 is twisted till the torsional rigidity can be balanced with the torque M, and the angle of torsion of the fiber 3 can be easily measured by the measuring device 4.

With respect to the measuring device 4, several types of measuring methods can be utilized. That is, a direct reading method by using an indicating point, a direct reading method by an optical means, or an automatic reading method by an optical means etc. are used for reading the angle of torsion of the fiber at a precise condition. Therefore, by measuring the angle of torsion of the fiber relating to the angular velocity of the outside cylinder 7, a relation between the angle of torsion of the fiber 3 and torsional rigidity can be obtained in diagrammatical expression.

A modified measuring apparatus shown in FIG. 2, further comprises a control device 10 which controls the angular velocity of the turning device 8 by an output of comparison obtained by measuring a difference between an output of the measuring device 4 and a predetermined value A, and an indicator 11 which indicates the angular velocity of the turning device 8. Therefore, when angular velocities of the turning device 8 are measured at each condition of predetermined angles of torsion A, a diagram showing a relation between angles of torsion and torsional rigidities of a fiber can be easily obtained.

In another embodiment of the apparatus according to the present invention shown in FIG. 3, an upper end of the fiber 3 is rigidly gripped by the upper clamp 2a connected to a device 4a for measuring angle of torsion and a lower end of the fiber 3 is gripped by the lower clamp 2b connected to another device 4b for measuring angle of torsion. The device 4a connected to the upper turning device 8, while the device 4b is connected to the inside cylinder 5 for producing torque having the same construction as shown in the first embodiment of FIG. 1, except the omission of the turning device 8. When the turning device 8 rotates and the inside cylinder 5 is rotated at a constant angular speed by means of transmitting a turning force though the fiber 3, a torque M' towards a reverse direction to the turning direction of the inside cylinder 5 is imparted to the inside cylinder 5. The above-mentioned torque M' is represented as follows:

$$M' = \frac{4\pi\eta h R_1^2 R_2^2}{R_1^2 - R_2^2} \omega_2$$

where:
$\omega_2$ represents an angular velocity of the inside cylinder 5, other letters are used in the same meaning as in the equation (1).

Therefore, by changing the angular velocity of the turning device 8 any desirable torque can be imparted to the inside cylinder 5. The fiber 3 is turned till the torsional rigidity of the fiber 3 can be balanced to the torque M'. Therefore, the angle of torsion of the fiber 3 is measured by the devices 4a and 4b and a measuring device 9 measures a difference of angles of torsion between both devices 4a and 4b. For example, if a pulse generator, which generates a signal at a time of passing of a point of a turning member before a predetermined position, is applied to the devices 4a and 4b, and the measuring device 9 measures the time interval between the pulses generated by the devices 4a and 4b, the angle of torsion of the fiber 3 can be obtained by measuring the above-mentioned time intervals. Therefore, by means of measuring the angles of torsion to the angular velocities of the inside cylinder 5, a diagram showing a relation between the angle of torsion and the torsional rigidity of the fiber 3 can be obtained.

An embodiment of the apparatus of the present invention shown in FIG. 4, further comprises a control device 10 which controls the angular velocity of the turning device 8 by an output of comparison obtained by measuring a difference between an output of the measuring device 9 and a predetermined value B and an indicator 11 which indicates the angular velocity of the turning device 8. Therefore, when angular velocities of the turning device 8 are measured at each condition of the predetermined values B, a diagram showing a relation between angles of torsion and torsional rigidities of a fiber can be obtained very easily.

Next, several different types of modifications of the apparatus according to the present invention are illustrated as follows.

In a modified apparatus for measuring the torsional rigidity of the filamentous material shown in FIG. 5, a fiber 24 is gripped at its ends by an upper clamp 23 and lower clamp 25 respectively. The upper clamp 23 is connected to a device 22 for measuring angle of torsion and is also connected to a turning device 21 which rotates at a constant low angular speed. The lower clamp 25 is connected to a measuring device 26 which detects the turned angle of an inside cylinder. An outside cylinder 29 contains a viscous liquid 28 and the inside cylinder 27 floats in the viscous liquid 28 in such a way that the inside cylinder 27 is disposed coaxially in the outside cylinder 29. A measuring device 30 for measuring the turning angular velocity of the outside cylinder 29 is connected to the turning device 31 which can be driven at variable angular speeds. Therefore, when the outside cylinder is turned by the turning device 31, a turning torque corresponding to the angular velocity of the above-mentioned turning is imparted to the inside cylinder 27. When the turning device 21 turns at a low angular velocity, in other words, when the upper clamp 23 is turned, the turning device 31 is driven so that the angular position of the lower end of the fiber 24 is kept at a constant initial position by means of an output of the measuring device 26 through a control device 32 and thereby the outside cylinder 29 is turned towards a reverse direction to the turning direction of the turning device 21, therefore, torque towards the reverse direction to the turning direction of the device 21 is imparted to inside cylinder 27 and applied to the fiber 24. Therefore, at a stable condition, the lower end of the fiber 24 is fixed in a stationary condition by means of the above-mentioned torque. In the above-mentioned position, the turning angle of the upper clamp 23 coincides with an angle of torsion of the fiber 24, while the angular velocity of the outside cylinder 29 is in proportion to the above-mentioned torque imparted to the fiber 24, therefore, a torsional rigidity of the fiber 24 can be obtained by measuring the above-mentioned turning angle of the upper clamp 23 and the angular velocity of the outside cylinder 29. The torsional rigidity of the fiber 24 can be automatically and continuously measured by recording in a recorder 33 the outputs of the measuring device 22 and 30, simultaneously.

In the measuring device for measuring the angle of torsion shown in FIG. 6, utilized for the apparatus of FIG. 5, a reflection plate 34 is disposed at an intervened position between the lower clamp 25 and the inside cylinder 27. A light projected from a light source 35 is reflected by the reflection plate 34, and led to the photo-cell 37 by way of passing through a slit 36. As shown in the spread out drawing of FIG. 7, the light intensity of the above-mentioned reflection is in proportion to the reflection area, the output of the photo-cell 37 corresponding to the angular displacement or angular position can be shown in linear as shown in FIG. 8. Therefore, the angular position of the inside cylinder 27 can be detected by means of utilizing the output of the photo-cell 37.

In FIG. 9 is shown an embodiment of a measuring device 30 for measuring the angular velocity of the outside cylinder 29, a turning device 31 which can be driven at variable speeds, and a control device 32 applied for the apparatus shown in FIG. 5. The control device 32 comprises a circuit provided with an integrating circuit, and a pulse motor is used for the turning device 14. In FIG. 9, an output voltage corresponding to the angular position of the inside cylinder 27 is obtained by the measuring device 26, the difference between the above-mentioned output-voltage and the predetermined voltage is amplified by means of a differential amplifier 38, a servomotor 39 is rotated in accordance with the output of the amplifier 38. A potentiometer 40 is mechanically connected to the servomotor 39, so that the potentiometer 40 is driven together with the servomotor 39. That is, the difference between the output voltage of the measuring device 26 and the predetermined voltage is integrated by the potentiometer 40. By a variable frequency oscillator 41, an output having a corresponding frequency to the output of the potentiometer 40 is obtained, and a pulsemotor 43 driven by way of a pulsemotor driving circuit 42 in accordance with the above-mentioned output of the oscillator 41. As the angular speed of the pulsemotor 43 is in proportion to the oscillating frequency of the oscillator 41, this speed is also in proportion to the output of the potentiometer 40. The potentiometer 40, therefore, can be used as a measuring device for measuring the angular velocity of the pulsemotor 43.

The apparatus shown in FIG. 10 is an embodiment applying the above-mentioned elements shown in FIG. 9. In FIG. 10, to avoid an error caused by any contact of elements, a so-called photoelectric system such as the above-mentioned photo-cell shown in FIG. 6 is applied for the measuring device 26, and in the control device 32, amplification of the difference between the output of the photo-cell and the predetermined value set by manual operation is carried out, the servomotor 39 is driven by the output of the differential amplifier 38, the frequency of the output of the oscillator 41 is converted into the output of the potentiometer 40 proportionally, thereby the angular velocity of the pulsemotor 43 is changed. A potentiometer is used as the measuring device 22. A so-called X-Y recorder 33 is also used for the present apparatus, therefore, the outputs of X, Y co-ordinates are connected to the potentiometer 22 and the potentiometer 40 respectively, a characteristic curve showing the relation between the angle of torsion and the torsional rigidity can be recorded automatically.

As it is clearly shown in the above-mentioned embodiments of the present invention, the angle of torsion of the fiber can be measured without any disturbance or interference caused by direct contact with the specimen. Further, as the control device is provided with an integrator, as a pulse-motor is used for turning device which drives at variable angular speeds the following excellent measuring results can be obtained, that is:

1. As the measurement does not carry out the measuring of torque directly, very fine torque of fiber can be measured by means of the apparatus of the present invention; while, in the conventional measuring methods and apparatus illustrated in the preamble of the present specification, using a non-contacting bearing or a torque measuring device etc., it is always impossible to measure the very small torque accurately and correctly.

2. As the measurement of the angle is carried out by a so-called Null-method, the measurement can be carried out very accurately.

3. By choosing the viscosity of the viscous liquid, the range of measurement is very wide, therefore the torsional rigidity in a wide range can be measured.

4. As a tension imparted to the sample fiber is caused by the difference between the dead weight below the lower clamp and the floating force of the inside cylinder, the tension can be chosen at the desired condition, and can be kept constant during the measurement. The precision of the measured torsional rigidity is almost $10^{-3}$ dyne.cm$^2$.

5. The relation between the angle of torsion and the torsional rigidity can be measured continuously. Therefore, a characteristic curve of the above-mentioned relation can be recorded automatically.

6. As the torsion is imparted to the measuring elements continuously, the measurement can be carried out in a similar condition as in a stationary condition, therefore any influence of the dynamic torsional rigidity can be avoided.

7. As the control device is provided with an integral element, the so-called off-set does not remain, the initial angular position of the inside cylinder can be easily obtained.

8. As the pulsemotor is used as the turning device which drives at variable speeds, the range of the rotation of the outside cylinder can be chosen in a wide range, further, as the angular velocity of the pulsemotor is proportionate to the frequency of the oscillator, it is very easy to measure the turning speed of the measuring element.

What is claimed is:

1. In an apparatus for measuring the torsional rigidity of a fibrous material through the impartation of a torque applied to the fibrous material by means of a rotating viscous liquid of known viscosity, an improvement comprising: upper and lower clamping means for clamping respective ends of a fibrous material whose torsional rigidity is to be measured; lower angle measuring means connected to said lower clamping means for measuring the torsional angle of the lower clamped end of the fibrous material; an inner cylinder connected at one end to said lower angle measuring means and having its other end in a free condition; an outer cylinder partly surrounding said inner cylinder; a viscous liquid of known viscosity disposed between said inner and outer cylinders supporting therein said free end of said inner cylinder; lower turning means for turning said outer cylinder at an adjustable angular velocity to effect rotational movement of said viscous liquid accompanied by rotational movement of said inner cylinder; upper turning means for turning said upper clamping means; and upper angle measuring means for measuring the torsional angle of the upper clamped end of the fibrous material.

2. An improvement according to claim 1 further comprising difference measuring means for measuring the difference between the torsional angles measured by said upper and lower angle measuring means.

3. An improvement according to claim 2, further comprising control means for controlling the angular velocity of said upper turning means in accordance with the deviation of the output from said difference measuring means from a preset reference magnitude; and indicator means for visibly indicating the angular velocity of said upper turning means.

4. An improvement according to claim 1, wherein said lower angle measuring means includes a light source capable of emitting light and a light reflector plate receptive of light emitted from said light source, and means locating said light reflector plate relative to said light source so the light reflection varies in proportion to the degree of turning of the fibrous material.

5. In an apparatus for measuring the torsional rigidity of a fibrous material through the impartation of a torque applied to the fibrous material by means of a rotating viscous liquid of known viscosity, an improvement comprising: upper and lower clamping means for clamping respective ends of a fibrous material whose torsional rigidity is to be measured; lower angle measuring means connected to said lower clamping means for measuring the torsional angle of the lower clamped end of the fibrous material and providing a corresponding output; an inner cylinder connected at one end to said lower angle measuring means and having its other end in a free condition; an outer cylinder partly surrounding said inner cylinder; a viscous liquid of known viscosity disposed between said inner and outer cylinders supporting therein said free end of said inner cylinder; lower turning means for turning said outer cylinder to effect rotational movement of said viscous liquid accompanied by rotational movement of said inner cylinder; upper turning means for turning said upper clamping means at a constant angular velocity; and control means for controlling the angular velocity of said lower turning means in accordance with the output from said lower angle measuring means.

6. An improvement according to claim 5, further comprising upper angle measuring means for measuring the torsional angle of said upper turning means; velocity measuring means for measuring the angular velocity of said lower turning means and proving a corresponding output; and recording means for simultaneously recording the outputs of both said lower angle and velocity measuring means on an X-Y coordinate diagram.

7. An improvement according to claim 5 including upper angle measuring means for measuring the torsional angle of said upper turning means; and wherein said control means includes an amplifier for amplifying the deviation of the output from said lower angle measuring means from a given preset magnitude and providing an amplified output signal, a servomotor driven in accordance with said amplified output signal, a potentiometer connected to said servomotor providing an output signal proportional to said amplified output signal, oscillating means for generating an output signal having a frequency proportional to the output signal from said potentiometer to control said lower turning means, and recording means for concurrently recording the output signal from said upper angle measuring means and the output signal from said potentiometer.

8. An improvement according to claim 5, wherein said lower angle measuring means includes a light source operable to emit light and a light reflector plate receptive of light emitted from said light source, and means locating said light reflector plate relative to said light source so that the light reflection varies in proportion to the degree of turning of the fibrous material.

9. An improvement according to claim 7, wherein said lower turning means includes a pulsemotor.

* * * * *